US008476844B2

(12) United States Patent
Hancock et al.

(10) Patent No.: US 8,476,844 B2
(45) Date of Patent: Jul. 2, 2013

(54) LIGHT EMITTING DIODE (LED) LIGHTING SYSTEM PROVIDING PRECISE COLOR CONTROL

(75) Inventors: Gary Hancock, Centereach, NY (US); Eric Johannessen, Patchogue, NY (US)

(73) Assignee: B/E Aerospace, Inc., Wellington, FL (US)

(*) Notice: Subject to any disclaimer, the term of this patent is extended or adjusted under 35 U.S.C. 154(b) by 799 days.

(21) Appl. No.: 12/275,268

(22) Filed: Nov. 21, 2008

(65) Prior Publication Data
US 2010/0128472 A1 May 27, 2010

(51) Int. Cl.
*H05B 39/00* (2006.01)

(52) U.S. Cl.
USPC .............. 315/307; 315/312; 315/291; 315/32

(58) Field of Classification Search
USPC .......................................... 315/312, 247, 224
See application file for complete search history.

(56) References Cited

U.S. PATENT DOCUMENTS

| | | | |
|---|---|---|---|
| 3,947,840 A | 3/1976 | Craford et al. |
| 4,765,731 A | 8/1988 | Williams |
| 5,681,756 A | 10/1997 | Norman et al. |
| 5,693,962 A | 12/1997 | Shi et al. |
| 5,705,285 A | 1/1998 | Shi et al. |
| 5,994,722 A | 11/1999 | Averbeck et al. |
| 6,016,038 A | 1/2000 | Mueller et al. |
| 6,028,323 A | 2/2000 | Liu |
| 6,091,195 A | 7/2000 | Forrest et al. |
| 6,211,626 B1 | 4/2001 | Lys et al. |
| 6,548,967 B1 | 4/2003 | Dowling et al. |
| 6,608,453 B2 | 8/2003 | Morgan et al. |
| 6,633,122 B2 | 10/2003 | Kijima et al. |
| 6,777,891 B2 | 8/2004 | Lys et al. |
| 6,882,101 B2 | 4/2005 | Ragle |
| 6,891,326 B2 | 5/2005 | Lu |
| 6,965,205 B2 | 11/2005 | Piepgras et al. |
| 6,967,448 B2 | 11/2005 | Morgan et al. |
| 6,975,079 B2 | 12/2005 | Lys et al. |
| 7,014,336 B1 | 3/2006 | Ducharme et al. |
| 7,015,825 B2 | 3/2006 | Callahan |
| 7,034,470 B2 | 4/2006 | Cok et al. |
| 7,038,399 B2 | 5/2006 | Lys et al. |
| 7,049,757 B2 | 5/2006 | Foust et al. |
| 7,090,890 B1 | 8/2006 | Sturm et al. |
| 7,113,541 B1 | 9/2006 | Lys et al. |

(Continued)

FOREIGN PATENT DOCUMENTS
FR 0 833 687 A1 6/2003

*Primary Examiner* — Jany Richardson
(74) *Attorney, Agent, or Firm* — Drinker Biddle & Reath LLP

(57) ABSTRACT

A lighting apparatus comprising a white LED and a RGB LED disposed on a mounting and at least partially enclosed by a housing. The RGB LED produces red, green and blue components of light. A white LED driver controls current to the white LED and a RGB LED driver controls current to the RGB LED. A lighting system including the lighting apparatus and a system controller having a memory in which preset lighting programs are stored. A method for method for providing wash lighting comprising the steps of emitting a current color and intensity from a white LED and from a RGB LED, receiving data representing a change of color and intensity from the current color and intensity for at least the RGB LED and emitting white light that is on the Planckian locus in the CIE 1931 chromaticity diagram.

23 Claims, 9 Drawing Sheets

U.S. PATENT DOCUMENTS

| | | | |
|---|---|---|---|
| 7,161,556 B2 | 1/2007 | Morgan et al. | |
| 7,173,383 B2 | 2/2007 | Vornsand et al. | |
| 7,186,003 B2 | 3/2007 | Dowling et al. | |
| 7,202,613 B2 | 4/2007 | Morgan et al. | |
| 7,228,190 B2 | 6/2007 | Dowling et al. | |
| 7,233,831 B2 | 6/2007 | Blackwell | |
| 2002/0078221 A1 | 6/2002 | Blackwell et al. | |
| 2002/0152045 A1 | 10/2002 | Dowling et al. | |
| 2003/0057884 A1 | 3/2003 | Dowling et al. | |
| 2003/0133292 A1 | 7/2003 | Mueller et al. | |
| 2004/0052076 A1 | 3/2004 | Mueller et al. | |
| 2005/0001537 A1 | 1/2005 | West et al. | |
| 2005/0116667 A1 | 6/2005 | Mueller et al. | |
| 2005/0253533 A1 | 11/2005 | Lys et al. | |
| 2005/0254241 A1 | 11/2005 | Harwood | |
| 2006/0033425 A1 | 2/2006 | Miura et al. | |
| 2006/0054905 A1 | 3/2006 | Schwach et al. | |
| 2006/0126325 A1 | 6/2006 | Lefebvre et al. | |
| 2006/0181203 A1 | 8/2006 | Meng et al. | |
| 2006/0187081 A1* | 8/2006 | Gloisten et al. | 340/825.22 |
| 2006/0237636 A1* | 10/2006 | Lyons et al. | 250/228 |
| 2006/0255347 A1 | 11/2006 | DenBaars et al. | |
| 2007/0013057 A1 | 1/2007 | Mazzochette | |
| 2007/0064420 A1 | 3/2007 | Ng et al. | |
| 2007/0108455 A1 | 5/2007 | Sun et al. | |
| 2007/0121319 A1 | 5/2007 | Wolf et al. | |
| 2007/0170444 A1 | 7/2007 | Cao | |
| 2007/0211460 A1 | 9/2007 | Ravkin | |
| 2007/0228397 A1 | 10/2007 | Taninaka et al. | |
| 2007/0237284 A1 | 10/2007 | Lys et al. | |
| 2007/0268694 A1 | 11/2007 | Bailey et al. | |
| 2007/0290614 A1 | 12/2007 | Wolk et al. | |
| 2007/0296464 A1* | 12/2007 | Lewko | 326/93 |
| 2008/0094837 A1* | 4/2008 | Dobbins et al. | 362/249 |
| 2010/0110706 A1* | 5/2010 | Eckel et al. | 362/471 |

* cited by examiner

COMMAND TABLE

| CMD | HEX | DESCRIPTION |
| --- | --- | --- |
| 0 | 0 | All colors off |
| 1 | 1 | Direct to color "long command" |
| 2 | 2 | Color on power up with no comm "long command" |
| 3 | 3 | Set unit address to "Long command" |
| 4 | 4 | Status of unit "ignored on all address to prevent collisions" |
| 5 | 5 | Reserved |
| 6 | 6 | Reserved |
| 7 | 7 | Reserved |
| 8 | 8 | Reserved |
| 9 | 9 | Reserved |
| 10 | A | Set color temp of white to 2700K |
| 11 | B | Set color temp of white to 3000K |
| 12 | C | Set color temp of white to 2500K |
| 13 | D | Set color temp of white to 4000K |
| 14 | E | Set color temp of white to 4500K |
| 15 | F | Set color temp of white to 5000K |
| 16 | 10 | Set color temp of white to 5500K |
| 17 | 11 | Set color temp of white to 6000K |
| 18 | 12 | Set color temp of white to 7000K |
| 19 | 13 | Max white intensity |
| 20 | 14 | Set 50% White intensity |
| 21 | 15 | Set 25% White intensity |
| 22 | 16 | Intensity increase 1 step "white or color" |
| 23 | 17 | Intensity increase 2 steps |
| 24 | 18 | Intensity increase 4 steps |
| 25 | 19 | Intensity increase 8 steps |
| 26 | 1A | Intensity increase 16 steps |
| 27 | 1B | Intensity decrease 1 step |
| 28 | 1C | Intensity decrease 2 steps |
| 29 | 1D | Intensity decrease 4 steps |
| 30 | 1E | Intensity decrease 8 steps |
| 31 | 1F | Intensity decrease 16 steps |
| 32 | 20 | White color temp increase 1 step |
| 33 | 21 | White color temp increase 2 steps |
| 34 | 22 | White color temp increase 4 steps |
| 35 | 23 | White color temp increase 8 steps |
| 36 | 24 | White color temp increase 16 steps |
| 37 | 25 | White color temp decrease 1 step |
| 38 | 26 | White color temp decrease 2 steps |

FIG. 5A

| CMD | HEX | DESCRIPTION |
|---|---|---|
| 39 | 27 | White color temp decrease 4 steps |
| 40 | 28 | White color temp decrease 8 steps |
| 41 | 29 | White color temp decrease 16 steps |
| 42 | 2A | Saturation increase 1 step |
| 43 | 2B | Saturation decrease 1 step |
| 44 | 2C | Increase red intensity 1 step |
| 45 | 2D | Increase red intensity 2 steps |
| 46 | 2E | Increase red intensity 4 steps |
| 47 | 2F | Increase red intensity 8 steps |
| 48 | 30 | Increase red intensity 16 steps |
| 49 | 31 | Decrease red intensity 1 step |
| 50 | 32 | Decrease red intensity 2 steps |
| 51 | 33 | Decrease red intensity 4 steps |
| 52 | 34 | Decrease red intensity 8 steps |
| 53 | 35 | Decrease red intensity 16 steps |
| 54 | 36 | Increase green intensity 1 step |
| 55 | 37 | Increase green intensity 2 steps |
| 56 | 38 | Increase green intensity 4 steps |
| 57 | 39 | Increase green intensity 8 steps |
| 58 | 3A | Increase green intensity 16 steps |
| 59 | 3B | Decrease green intensity 1 step |
| 60 | 3C | Decrease green intensity 2 steps |
| 61 | 3D | Decrease green intensity 4 steps |
| 62 | 3E | Decrease green intensity 8 steps |
| 63 | 3F | Decrease green intensity 16 steps |
| 64 | 40 | Increase blue intensity 1 step |
| 65 | 41 | Increase blue intensity 2 steps |
| 66 | 42 | Increase blue intensity 4 steps |
| 67 | 43 | Increase blue intensity 8 steps |
| 68 | 44 | Increase blue intensity 16 steps |
| 69 | 45 | Decrease blue intensity 1 step |
| 70 | 46 | Decrease blue intensity 2 steps |
| 71 | 47 | Decrease blue intensity 4 steps |
| 72 | 48 | Decrease blue intensity 8 steps |
| 73 | 49 | Decrease blue intensity 16 steps |
| 74 | 4A | Color shift clockwise 1 step |
| 75 | 4B | Color shift counterclockwise |

FIG. 5B

LIGHT EMITTING DIODE (LED) LIGHTING SYSTEM PROVIDING PRECISE COLOR CONTROL

FIELD OF THE INVENTION

This invention pertains to LED lighting systems and the methods and apparatus for providing LED light.

BACKGROUND OF THE INVENTION

Conventional methods, apparatus and systems are generally known in the art for providing mood or wash lighting in airplanes with an array of different colors and brightness levels. Conventional lighting apparatus use multiple single color Light Emitting Diodes (LEDs) to create these lighting effects.

There are a number of problems with such conventional methods, apparatus and systems. The mixing of the light from the separate red, green and blue LEDs is often incomplete and creates separate bands of color instead of the desired mixed color. Furthermore, current designs provide an inefficient use of aircraft space because, in order to create the desired colored lighting effects, the light from a relatively large number of separate red, green and blue LEDs must be combined. In addition, these conventional systems and apparatus use linear current sources that are pulse width modulated at low resolution to produce slow responding visible steps in brightness and imprecise color control when dimming. The use of these linear current sources with large voltage drops requires more power from the aircraft and creates a correspondingly large amount of heat that must be dissipated, thus, requiring large heat sinks.

In addition, conventional lighting apparatus operate in a relatively narrow voltage range. Thus, when the voltage supply in the aircraft drops, the lighting system and its lighting apparatus become unstable resulting in the LEDs flickering or turning off. Furthermore, conventional lighting apparatus use low resolution dimming schemes that limit the number of steps that can be taken to dim the light. This produces visual artifacts and loss of color control as the light nears its minimum dimming range. In a conventional lighting apparatus and system, 8-bit control is used thus limiting the total number of dimming steps, or levels, to 256. For example, to produce a certain color of amber at full brightness, the green LEDs are set to 250 and the red LEDs are set to 222. For this scheme, the ratio of the color level of green LEDs to red LEDs is 1.126:1. If the system is dimmed 50%, the green LEDs are now set to 125 and the red LEDs set to 111. The ratio is still 1.126:1. To maintain this ratio when the system is dimmed to 5% of the original brightness, the green LEDs would need to be set to 12.5 and the red LEDs set to 11.1. Instead, in conventional lighting systems using 8-bit control, the green LEDs are truncated to a color level of 12 and the red LEDs to a level of 11. The new ratio of 1.09:1 results in a noticeable difference in lighting color.

Calibration of light intensity to match batches of LEDs or to match aged LEDs with new replacement LEDs is a problem in conventional systems. It is typically achieved through a calibration divisor in the software that tends to reduce color resolution further. Even if a 10-bit system were used instead of an 8-bit system for the LED brightness, the use of such a calibration driver tends to drop the effectiveness of the 10-bit system to that of an 8-bit system when the new LEDs are much more efficient than the older LEDs to which they are being matched.

Current lighting system networks using RS485 require end of the line termination hardware so that reflections do not occur in the transmission line. Also, previous designs have used simple, direct protocol for communication. This creates bandwidth problems for high resolution systems that are too cost sensitive to use Ethernet or other such high speed networks.

Conventional systems are designed such that each individual LED limits at a predetermined level. When a low color temperature or monochromatic saturated color is produced, conventional systems simply produce less light instead of adjusting for the additional headroom of color available because of the substantially lower current draw.

A need exists for improved methods and apparatus to provide high resolution control for smooth dimming and precise control of color temperature.

BRIEF SUMMARY OF THE EMBODIMENTS

In an embodiment, a lighting apparatus is provided comprising a white LED and at least one single chip that produces red, green and blue components of light (RGB LED) disposed on a mounting and at least partially enclosed by a housing and a lens. The RGB LED produces red, green and blue components of light. In an embodiment, the lighting apparatus includes a plurality of white LEDs and a plurality of RGB LEDs. A white LED driver controls current to the white LED(s) and a RGB LED driver controls current to the RGB LED(s). The LED drivers control the intensity and color of the light emitted by the white and RGB LEDs through pulse width modulation (PWM) of the current of each of the outputs of the LED drivers. In the RGB LED driver, there is a separate 10-bit register for the color data of the PWM signal for each of the red, green and blue components of light. Similarly, in the white LED driver, there is a 10-bit register for the data of the PWM signal for the white LEDs. In another embodiment of the invention, a lighting system includes the lighting apparatus described above and a system controller, having a memory in which preset lighting programs are stored, that sends lighting information, such as color and intensity, to the lighting apparatus.

The invention provides a method of providing one billion wash lighting colors in an array of different brightness levels with smooth color transitions from color shade to color shade. In addition, the lighting unit and system of the present invention produce continuously variable white color temperature as defined by the Planckian locus on the CIE 1931 chromaticity diagram and achieve the effect of dimming an incandescent light by following the Planckian locus to increase or decrease the color temperature of the emitted light. The method of the invention comprises the steps of emitting a current color and intensity from a white LED and from a RGB LED, receiving data representing a change of color and intensity from the current color and intensity for at least the RGB LED and emitting white light that is on the Planckian locus in the CIE 1931 chromaticity diagram. These and other advantages of the invention will be apparent from the description of the invention provided herein.

BRIEF DESCRIPTION OF THE DRAWINGS

The above-noted and other advantages of the invention will be apparent from the description of the invention provided herein with reference to the attached drawings in which:

FIG. 5A is a table of command information in the 4 byte packet in an embodiment of the invention; and FIG. 5B is a continuation of the table of command information in FIG. 5A in an embodiment of the invention.

DETAILED DESCRIPTION OF THE EMBODIMENTS

The embodiment of the invention described below is not intended to be exhaustive or to limit the invention to the precise structure and operation disclosed. Rather, the embodiment described below has been chosen and described to explain the principles of the invention and its application, operation and use in order to best enable others skilled in the art to follow its teachings.

Figure 1:
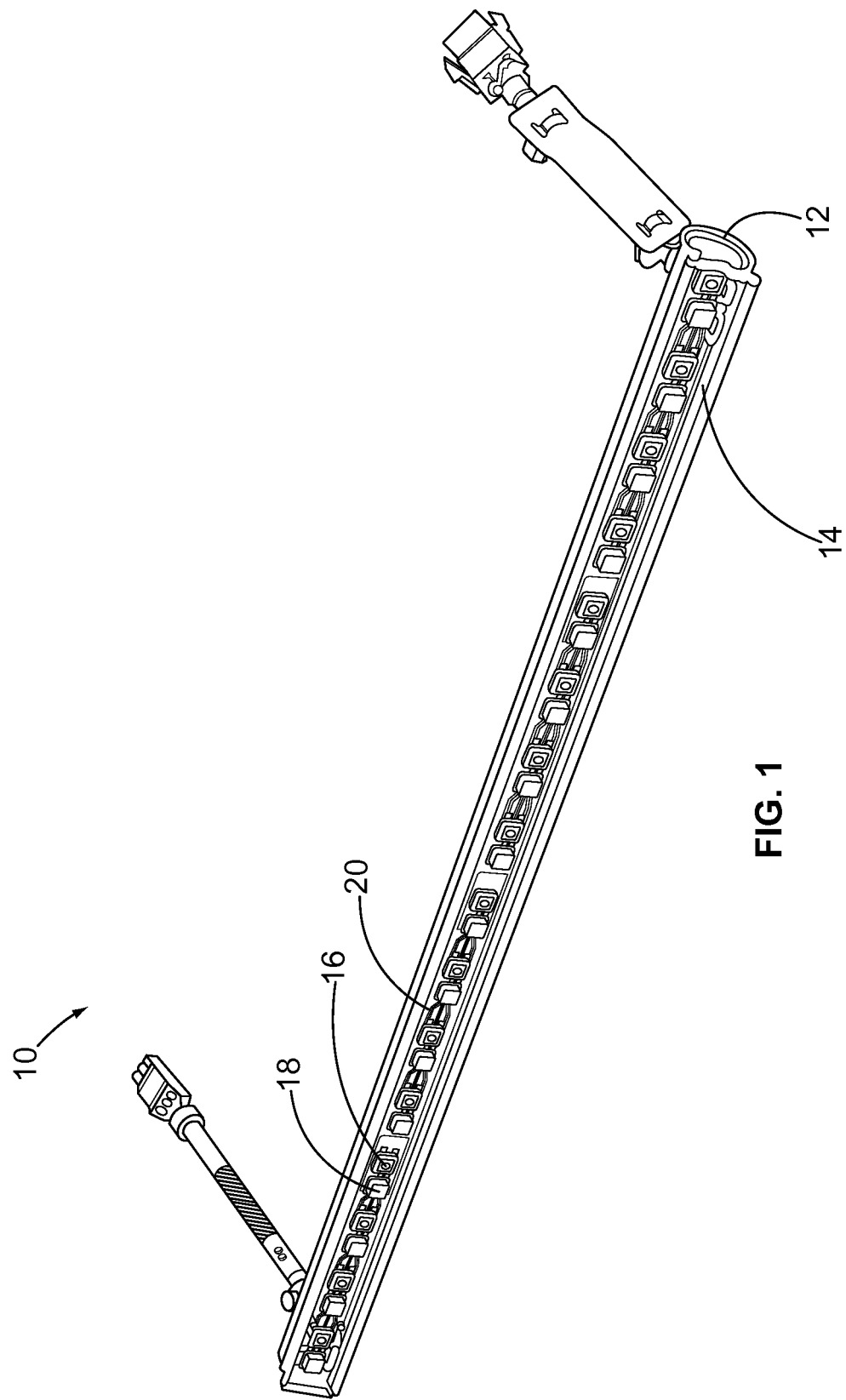
FIG. 1 is a perspective view of one embodiment of the lighting apparatus in accordance with the present invention.
Figure 2:
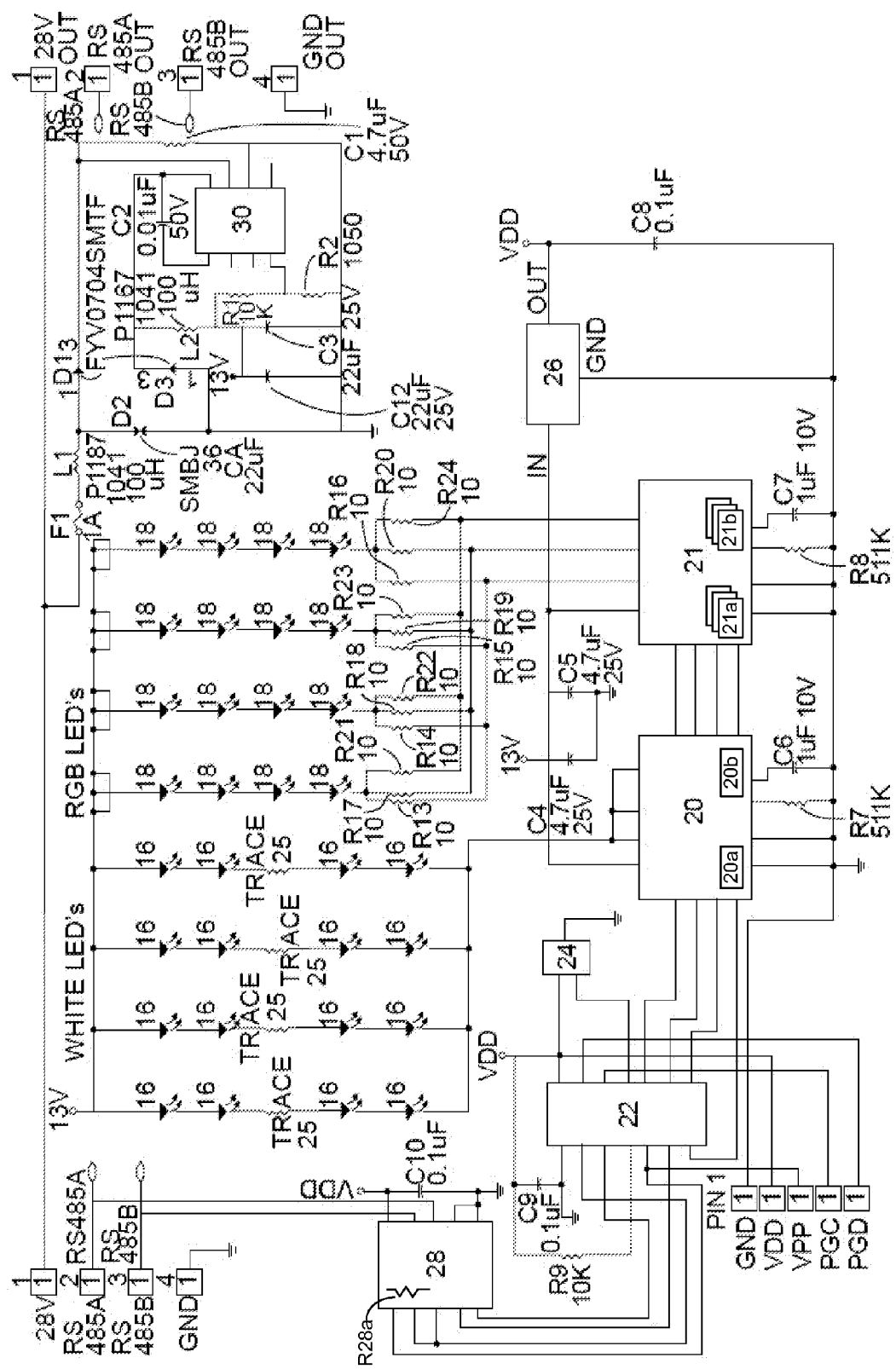
FIG. 2 is a circuit diagram of an embodiment of the lighting apparatus of FIG. 1.
Figure 3A:
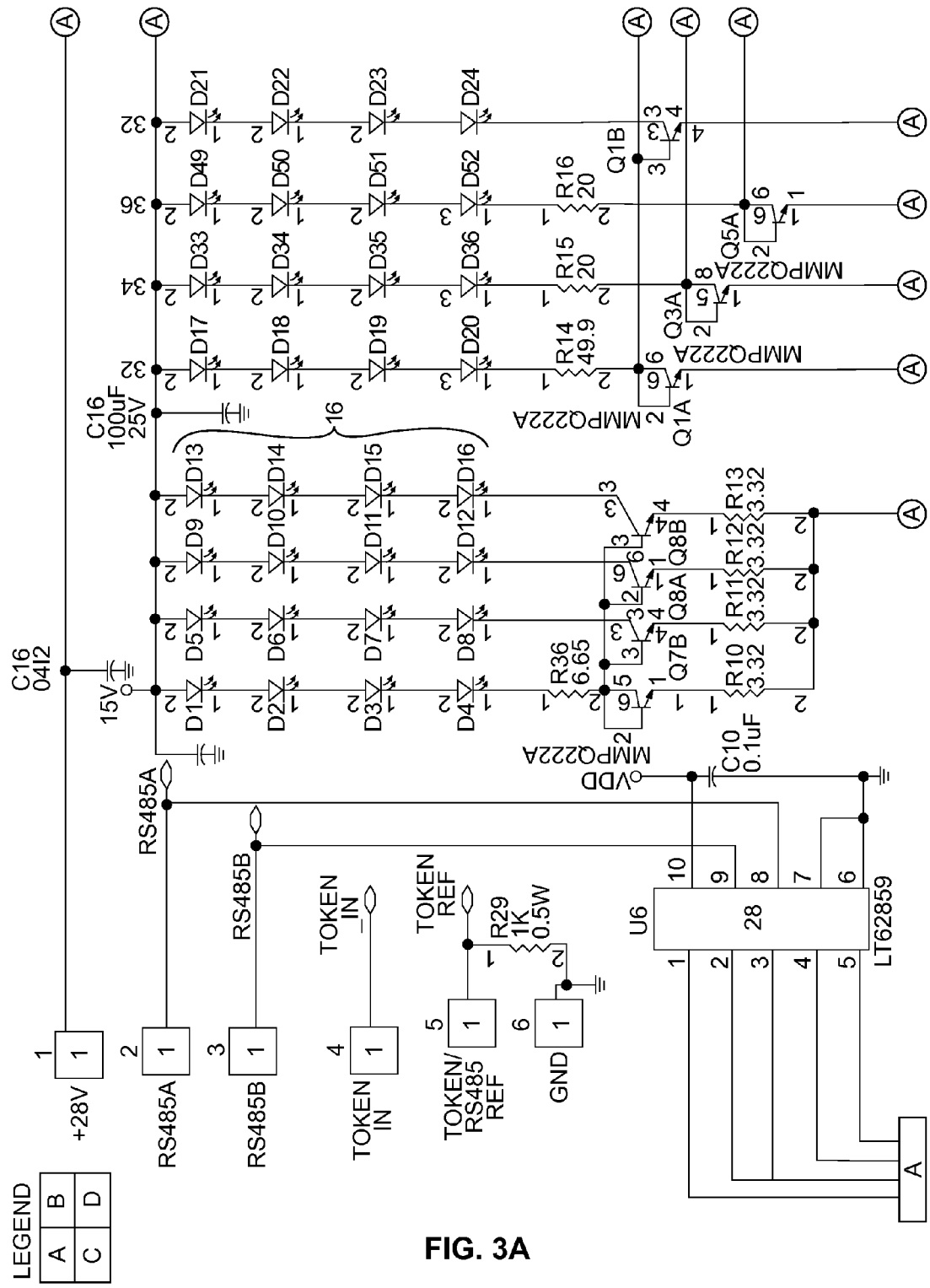
FIG. 3A is the first of four parts of an alternative circuit diagram of the electrical schematic of FIG. 2 showing additional detail for the LEDs.
Figure 3B:
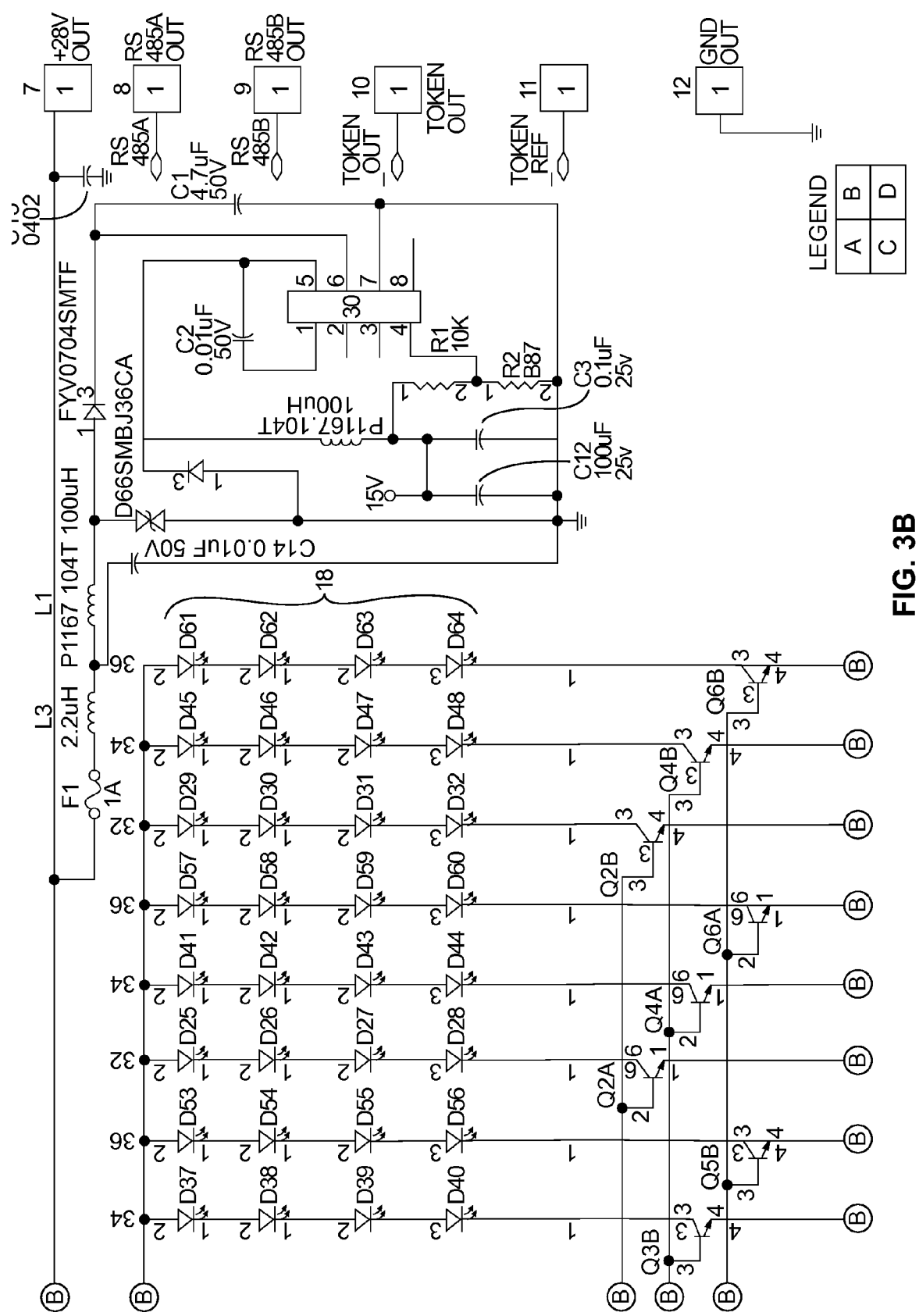
FIG. 3B is the second of four parts of the alternative circuit diagram for FIG. 2.
Figure 3C:
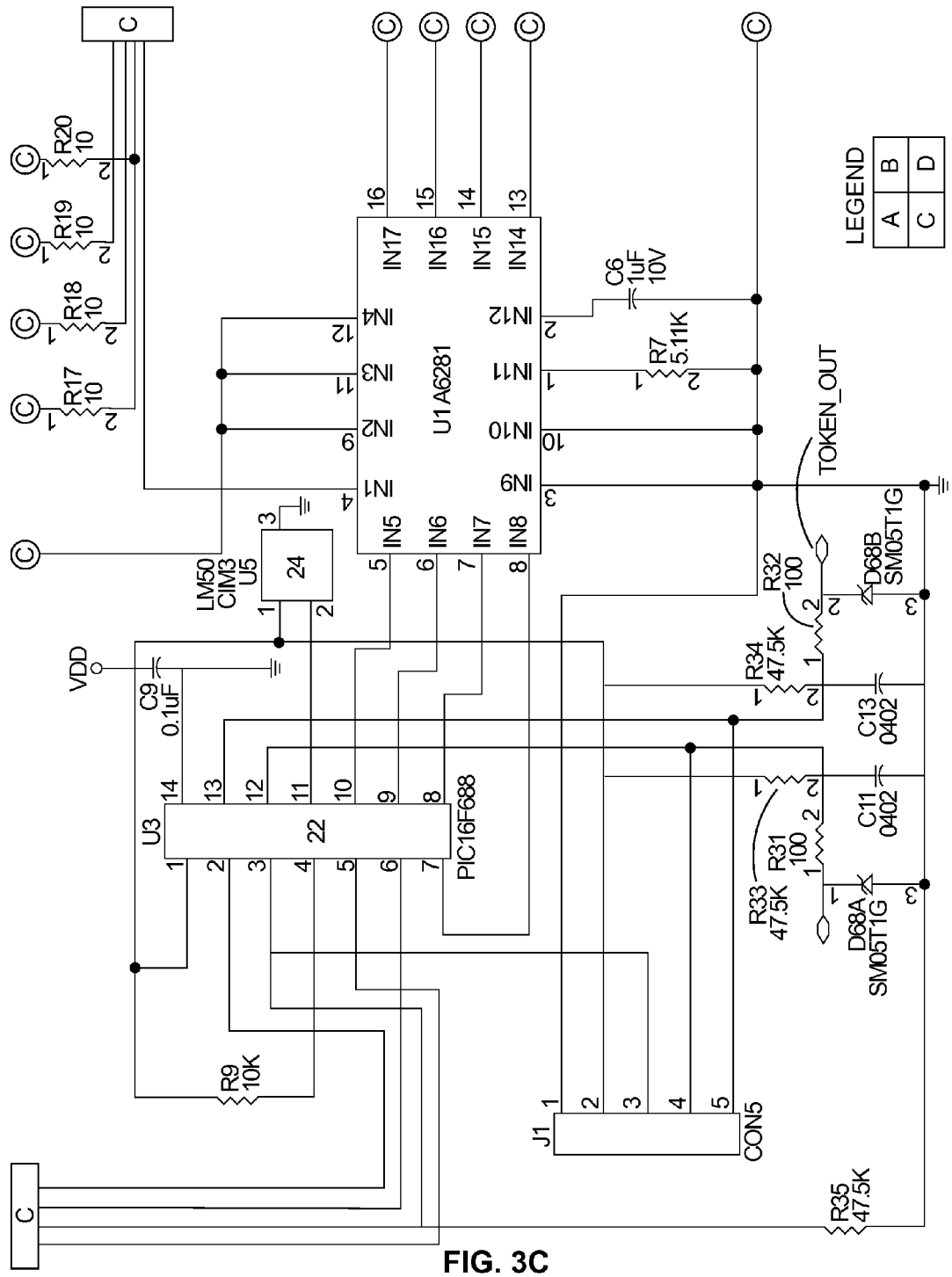
FIG. 3C is the third of four parts of the alternative circuit diagram for FIG. 2.
Figure 3D:
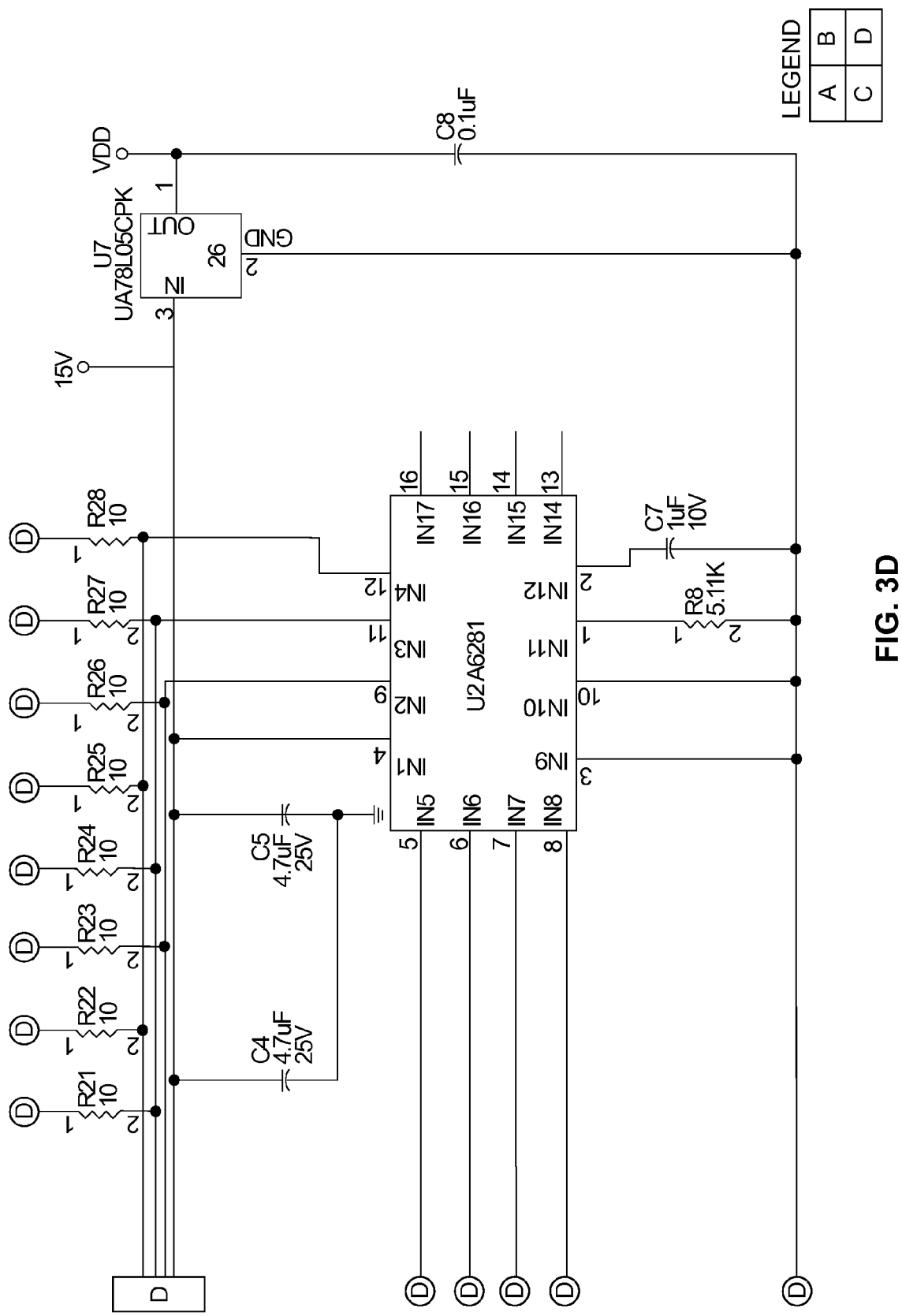
FIG. 3D is the fourth of four parts of the alternative circuit diagram for FIG. 2.

Turning now to the figures, FIG. 1 shows a perspective view of one embodiment of the lighting unit, generally marked 10, of the present invention. In FIG. 1, the lighting unit 10 comprises a housing 12 and lens 14 enclosing at least one white LED 16 and at least one single chip that produces red, green and blue components of light (RGB LED) 18. In an embodiment, the NSSM016D chip by the Nichia® Corporation is used for the RGB LED 18. The white LED 16 and the RGB LED 18 are disposed on an electrical mounting 20. Although not limited to these, in an embodiment the mounting 20 is a printed circuit board, the housing 12 is aluminum alloy with an anodized finished and the lens 14 is flame resistant polycarbonate. Other suitable materials may be used. FIGS. 2-3 illustrate circuit diagrams for an embodiment of the invention. In FIGS. 2-3, all resistor values are in Ohms.

As illustrated in FIG. 2, the white LEDs 16 are connected to a white LED driver 20 and the RGB LEDs 18 are connected to RGB LED driver 21. In an embodiment, both the white LED driver 20 and the RGB LED driver 21 are three channel constant current LED drivers with programmable PWM control. In another embodiment, the A6281 LED driver by Allegro® is used for both the white LED driver 20 and the RGB LED driver 21. The LED drivers 20, 21 control the intensity and color of the light emitted by the LEDs 16, 18 through pulse width modulation of the current of each of the outputs of the LED drivers. In the RGB LED driver 21, there is a separate 10-bit register 21a for the color data of the PWM signal for each of the red, green and blue components of light (there are three 10-bit registers 21a in the RGB LED driver 21). Similarly, in the white LED driver 20, there is a 10-bit register 20a for the color data of the PWM signal for the white LEDs.

Each of the LED drivers 20, 21 also includes 7 bit registers 20b, 20b to control the current source on their respective output channels. For example, in the RGB LED driver 21 one channel controls the current to the red lighting components of the RGB LEDs 18, one channel controls the current for the green lighting components of the RGB LEDs 18 and one channel controls the current for the blue lighting components of the RGB LEDs 18. Thus, if two lighting units are different in intensity, the system can adjust the peak value of each color component of the light emitted by the RGB LEDs 18 without adversely affecting dimming and color resolution control as experienced when conventional calibration software divisors are used. This enables more efficient matching of different lighting units within a lighting system or application.

LED drivers 20, 21 are electrically connected to each other and to a microcontroller 22 disposed within the lighting unit. In an embodiment, the microcontroller is a flash microprocessor, such as a PIC16F688 by Microchip™, having RAM and about 256 bytes of EEPROM data memory. Other types of suitable microcontrollers may be used in alternative embodiments. A temperature sensor 24 is connected to the microcontroller 22 and a voltage regulator 26 is connected to the LED drivers 20, 21. In an embodiment, the temperature sensor is the LM50CIM3 by National Semiconductor® and the voltage regulator is the UA78L05CPK by Texas Instruments®.

The present invention may also include automatic end-of-the-line termination. The microcontroller is connected to a transceiver 28 in the lighting unit that, in an embodiment, includes an integrated, logic-selectable 120 Ohm termination resistor R28a. In an embodiment, the transceiver 28 is the LTC2859 by Linear Technology®. In this embodiment, an installer of the lighting system selects the unit address, and the lighting system 50 (FIG. 4) automatically knows the end unit and digitally turns on a 120 Ohm resistor R28a. This reduces complexity by not requiring separate terminators or special end units.

The lighting unit also includes an integrated switching regulator 30 such as a DC/DC converter. In an embodiment, the TPS5410 by Texas Instruments® is used as the switching regulator 30. The wide range switching regulator 30 provides efficient power toplogy for the lighting unit. The switching regulator 30 remains cools and quiet (low EMI) and allows the lighting unit to run from approximately 14 V to approximately 40V without any loss in output or stability unlike conventional systems having narrow operating ranges that experience flickering and shut down when the voltage supply in the aircraft drops. In an embodiment the lighting unit will run on about 24V or about 28V.

FIGS. 3A-3D illustrate an alternative schematic that shows more detailed electrical connections for the red portion 32 of the RGB LEDs 18, the green portion 34 of the RGB LEDs 18 and the blue portion 36 of the RGB LEDs 18 that were shown collectively on FIG. 2 as RGB LEDs 18.

Figure 4:
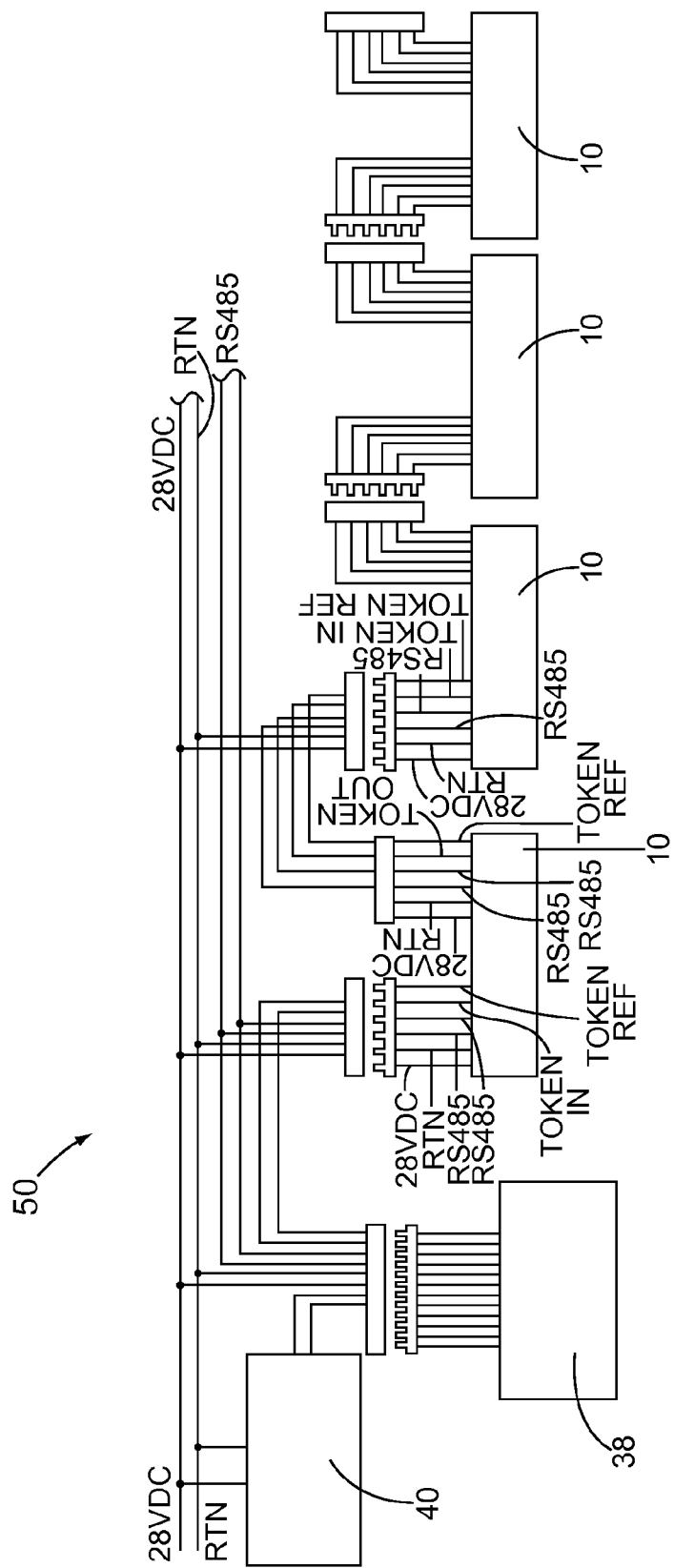
FIG. 4 is a view of one embodiment of a lighting system in accordance with the present invention.

In an embodiment of the lighting system, as shown in FIG. 4 and generally marked 50, lighting units 10 are connected to a system controller 38 that controls the color and intensity of light produced by the units 10. In an embodiment, the lighting system is on an aircraft. The individual lighting units 10 of the lighting system are individually addressable via software. The system controller 38 includes a removable memory card interface for storing preset programmed color scenarios and preset ranges of white color temperatures. Depending upon the application and the number of lighting units used, in other embodiments the system controller 38 may be connected to a master controller 40 that provides power and the control signals for dimming the lighting units and generating lighting color. In operation, when a master controller 40 is used as part of the lighting system of the present invention, the system controller 38 may function as system subset of the master controller 40 and receive lighting override commands from the master controller.

There is a constant pooling of the data lines for the system controller 38 communication. In an embodiment, the lighting units 10 have the ability of going to a full white light condition (about 7000° K) when there is a loss of communication from the system controller 38. In the event of several pooling errors, the lighting units 10 may default to a full on white condition. Once communication is reestablished through the pooling cycle then lighting units 10 will resume to the command function set by the system controller 38.

In yet other embodiments that do not require the data control of a master or system (intermediate) controller, the lighting unit 10 may be calibrated to a specific light output intensity and color (or white) setting. This calibration is stored in the microcontroller 22 as part of the RGB LED Driver 21 register data. Access of this data and calibration is made through the mounting 20 by RGB color and light output intensity alignment calibration hardware. This stand alone functionality may be desired where the lighting unit is being used in applications that requires only on/off functionality or dimming of the light intensity by a local control.

The input voltage range for the lighting system and units is about 20 to about 32 VDC. In an embodiment, the input voltage is about 28 VDC and the input current is about 186 mA per foot (at about 28 VDC) and approximately full brightness. In an embodiment described above, the power consumption at about full brightness is about 5.2 W per foot of lighting.

In operation, the present invention, as described, provides one billion wash lighting colors in an array of different brightness levels with smooth color transitions from color shade to color shade. In addition, the lighting unit and system of the present invention produce continuously variable white color temperature as defined by the Planckian locus on the CIE 1931 chromaticity diagram.

While it is known in the art that the proper mix of red, green and blue emitted light can create various different color temperatures of white, the present invention achieves the effect of dimming an incandescent light by following the Planckian locus to increase or decrease the color temperature of the emitted light. This precise control of the white color temperature is accomplished by combining light from the white LEDs 16 and RGB LEDs 18. Use of a single chip for each RGB LED substantially improves the color mixing. The color of white produced can range from a very cool white (approximately 8000° K) to a warm white (approximately 2700° K) and is set independently of the intensity. In an embodiment the light output is approximately 12 footcandles at a distance of about 28 inches.

The lighting system 50 of the present invention uses 10-bit pulse width modulation to provide approximately 1024 discrete steps in brightness. The system smoothly dims to sub-visual levels while still maintaining color accuracy, without visual stepping of colors, and a high Color Rendering Index (CRI) thereby providing continuously variable color temperature adjustments that follow the Planckian locus.

Also disclosed is the method for providing such wash lighting on an aircraft. Power from the aircraft is provided to the lighting system 50 and lighting units 10 described above. In an embodiment, lighting commands are sent from the system controller 38 to each lighting unit 10. The transceiver 28 of each lighting unit 10 receives the lighting commands from the system controller 38 and sends the received data to the microcontroller 22. The microcontroller 22 communicates the received color and intensity information to the white LED driver 20 and the RGB LED driver 21. In the RGB LED driver 21, there is a separate 10-bit register for the data received for the red component, a separate 10-bit register for the data received for the green component and a separate 10-bit register for the data received for the blue component of the desired lighting color and intensity. Similarly, in the white LED driver 20, there is a 10-bit register for the received data representing the color and intensity desired for the white LEDs. The LED drivers 20, 21 control the intensity and color of the light emitted by the LEDs 16, 18 through pulse width modulation of the current at each of the outputs of the LED drivers 20, 21. The white LED driver 21 and the RGB LED driver 21 generate PWM outputs that represent the color and intensity information received from the microcontroller 22. The white LEDs 16 emit a color and intensity of light based on the data in the output signal received from the white LED driver 20. The RGB LEDs 18 emit a color and intensity of light based on the data in the output signals received from the RGB LED driver 21.

The lighting system 50 utilizes data compression techniques. By splitting the serial protocol into two types of commands (initial condition and vectoring) the system can be controlled in a way that gives full resolution but reduces speeds required by the bus. This technique is implemented by first setting the initial condition of color and intensity and then providing the lighting units 10 with a direction of change (color vector) rather than a new set of data for each change of intensity or color. Once the initial set up of color and intensity of light is established, the system controller 38 sends, via the transceiver 28, lighting commands to the microcontroller 22 of each lighting unit 10. The data received by the microcontroller 22 represents the change of color and intensity from the current color and intensity of the RGB LEDs 18 and the white LEDs 16. This data is communicated from the microcontroller to the LED drivers 20, 21. Based on the data received from the microcontroller, the white LED driver 20 adjusts its output PWM signal to reflect the new level of color and intensity for the white LEDs 16 and the RGB LED driver 21 adjusts its output PWM signal to reflect the new level of color and intensity for the RGB LEDs 18. In another embodiment, a master controller 40 provides power and the control signals for dimming the lighting units 10 and generating lighting color and intensity. In an embodiment where the master controller 40 is part of the lighting system, the disclosed method provides for the system controller 38 to function as system subset of the master controller 40 and to receive lighting override commands from the master controller 40. The system controller 38 sends the commands received from the master controller 40 to the microcontroller 22 (via the transceiver) of each lighting unit 10.

The lighting unit 10 is compatible with devices using a simplex or half duplex RS485 network. In an embodiment, the software has a data range of 9,600 bits/s and supports half duplex error checking. In another embodiments 11,5200 bits/s may be used for, among other things, effects lighting. In one of the embodiments there are 250 lighting units 10 per channel. To support the bandwidth required by such an arrangement (250 lighting units per channel), there are two packet sizes. A 10 byte packet that carries full red, green and blue color information for initial conditions and setups. After the initial set up, the bulk of the communication of specific instructions is comprised of 4 byte reduced instruction sets of commands. These quick commands are a form of data compression and may used to create color transition effects, chase scenes and ultra smooth fades to and from any lighting color or intensity.

Both size packets have a start byte that tells the lighting unit 10 that a new command is coming. In an embodiment, the start byte is 255 which leaves the lower numbers open for easy addressing. The next byte is the address which may run from 0 to 250 signifying the lighting units 10. About 250 possible units can be uniquely addressed per port with a 0 being the address for all of the units. The third byte is a command byte which determines if the command is 4 bytes or 10 bytes. In one embodiment, if the command is a 4 byte packet, the command may comprise information similar that shown in the table of FIGS. 5A-5B. The table of FIGS. 5A-5B is not intended to be comprehensive and other 4 byte commands may be used in different embodiments. For 10 byte packets, the bytes after the command byte will be two bytes for red, two bytes for green, and two bytes for blue. There are three 10-bit numbers corresponding to the color information and they are each split up into two bytes where the five least significant bits of the first byte have the most significant bits of the 10-bit number and the 5 least significant bits of the second byte are the least significant bits of the same 10-bit number. The last byte in both cases is a simple additive checksum where if the data is wrong the unit will ignore it and be corrected on the next initial condition cycle.

In most embodiments, there will not be an acknowledgement after each packet unless a status command is sent to a specific address. If a status command is sent to a specific address, the response will have the same start byte and unit address with the temperature of the lighting unit in degrees Celsius and then a checksum at the end.

10-bit control in the LED drivers 20,21 allows the lighting unit 10 to produce about one billion wash lighting colors, in an array of different brightness levels, according to the method above, including, emitting white light on the Planckian locus in the CIE 1931 chromaticity diagram. The method above discloses emitting light color and intensity that follows the Planckian locus by increasing or decreasing the color temperature of the emitted light such that the effect of dimming an incandescent light is achieved.

The invention utilizes a constant power envelope. The LEDs are current limited based on the other LEDs. In an embodiment, an algorithm in the system controller 32 determines the maximum brightness of each color on every transition. The maximum power used is known to be currently 5.5 W when the LEDs are all on to produce white. While, the LEDs can handle more current than this, the invention maintains the thermal envelop.

The method of the invention also discloses receiving and storing in the memory of the system controller 38 fault data for the lighting system 50 and providing the fault data electronically to the master controller 40. The system controller 38 includes a memory for storing data related to system faults and the system and lighting unit environment for use with on-board diagnostics. For example, in an embodiment, if there is short in the line, the on-board diagnostics of the system controller 38 will detect this fault and will not activate the line of lighting units. As noted above, fault and environmental conditions are reported by the system controller 38 to the master lighting controller 40.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. A lighting apparatus, comprising:
   a white light emitting diode (LED) and a red-green-blue (RGB) LED disposed on a mounting and at least partially enclosed by a housing, the RGB LED capable of producing red, green and blue components of light;
   a first LED driver to control current to the white LED;
   a second LED driver to control current to the RGB LED; and
   a microcontroller electrically connected to the first and second LED drivers;
   wherein:
   the second LED driver further comprises at least one 10-bit register that receives data for at least one component of the light emitted by the RGB LED; and
   the received data comprises a value representing a change of color and intensity from a value representing a current color and intensity of at least the RGB LED for a particular color of the RGB LED.

2. The apparatus of claim 1, further comprising a direct current to direct current (DC/DC) converter.

3. The apparatus of claim 2, wherein the mounting is a printed circuit board.

4. The apparatus of claim 2, wherein the RGB LED is a single chip.

5. The apparatus of claim 2, wherein the housing comprises an aluminum alloy.

6. The apparatus of claim 2, further comprising a polycarbonate lens.

7. The apparatus of claim 2, further comprising a transceiver including a logic-selectable termination resistor.

8. The apparatus of claim 2, wherein the second LED driver is a three channel constant current LED driver.

9. The apparatus of claim 8, wherein the second LED driver further comprises a first 10-bit register that receives data for a red component of the light emitted by the RGB LED.

10. The apparatus of claim 9, wherein the second LED driver further comprises a second 10-bit register that receives data for a green component of the light emitted by the RGB LED.

11. The apparatus of claim 10, wherein the second LED driver further comprises a third 10-bit register that receives data for a blue component of the light emitted by the RGB LED.

12. The apparatus of claim 11, wherein the second LED driver further comprises a plurality of 7-bit registers.

13. The lighting apparatus of claim 1, wherein the value representing the change of color and intensity is represented in fewer bits than the value representing the current color and intensity.

14. A lighting system, comprising:
   a lighting apparatus comprising:
   a white light emitting diode (LED) and a red-green-blue (RGB) LED disposed on a mounting and at least partially enclosed by a housing, the RGB LED capable of producing red, green and blue components of light;

a first LED driver to control current to the white LED;

a second LED driver to control current to the RGB LED, the second LED driver comprising at least one 10-bit register that receives data for at least one component of the light emitted by the RGB LED, wherein the received data comprises a value representing a change of color and intensity from a value representing a current color and intensity of at least the RGB LED for a particular color of the RGB LED; and a microcontroller electrically connected to the first and second LED drivers; and the lighting system further comprising:

a system controller including a memory to store preset lighting programs.

15. The system of claim 14, wherein the lighting apparatus is addressable.

16. The system of claim 15, further comprising a master controller that communicates control signals to the system controller.

17. The system of claim 15, wherein the lighting apparatus comprises a plurality of lighting apparatus connected in series.

18. The system of claim 15, wherein the memory is to store fault data.

19. The lighting system of claim 14, wherein the value representing the change of color and intensity is represented in fewer bits than the value representing the current color and intensity.

20. A method for providing wash lighting, the method comprising:

emitting a current color and intensity from a white light emitting diode (LED) and from a red-green-blue (RGB) LED;

receiving data comprising a value representing a change of color and intensity from a value representing the current color and intensity of at least the RGB LED for a particular color of the RGB LED; and emitting white light that is on the Planckian locus in the International Commission on Illumination (CIE) 1931 chromaticity diagram.

21. The method of claim 20 further comprising dimming the emitted light.

22. The method of claim 21 further comprising:

receiving and storing in a memory lighting system fault data; and providing the fault data electronically to a master controller.

23. The method of claim 20, wherein the value representing the change of color and intensity is represented in fewer bits than the value representing the current color and intensity.

* * * * *